United States Patent
Setteducati (12)

(10) Patent No.: US 6,971,880 B1
(45) Date of Patent: Dec. 6, 2005

(54) DEFORMABLE DRAWING TABLET

(76) Inventor: Mark Setteducati, 218 E. 17 St., New York City, NY (US) 10003

( * ) Notice: Subject to any disclaimer, the term of this patent is extended or adjusted under 35 U.S.C. 154(b) by 99 days.

(21) Appl. No.: 10/071,805

(22) Filed: Feb. 8, 2002

(51) Int. Cl.$^7$ ............. G09B 19/00; A63H 33/38; B43L 1/00
(52) U.S. Cl. ................. 434/85; 434/97; 434/408; 434/415; 434/428; 273/155; 273/153 S; 446/149
(58) Field of Search .................... 434/406, 408, 434/413, 97, 415, 428, 85, 96; 273/153 S, 273/155; 446/151, 149

(56) References Cited

U.S. PATENT DOCUMENTS

| | | | | |
|---|---|---|---|---|
| 285,442 A | * | 9/1883 | Sweeney | 446/149 |
| 845,798 A | * | 3/1907 | Lehr | 446/151 |
| 862,671 A | * | 8/1907 | Smith | 40/436 |
| 1,101,567 A | | 6/1914 | Ridgway | |
| 2,022,627 A | * | 11/1935 | Whitney | 434/172 |
| 2,052,848 A | * | 9/1936 | Schilling | 273/153 S |
| 2,755,577 A | * | 7/1956 | Greensfelder | 40/435 |
| 2,894,337 A | * | 7/1959 | Rawlings | 434/176 |
| 3,889,397 A | * | 6/1975 | Flood | 434/88 |
| 3,918,173 A | * | 11/1975 | Logos | 434/327 |
| 4,043,056 A | * | 8/1977 | Savage | 434/96 |
| 4,422,641 A | | 12/1983 | Collin | |
| 4,674,983 A | * | 6/1987 | Dorsz | 434/300 |
| 5,267,732 A | | 12/1993 | Bowen et al. | |

* cited by examiner

Primary Examiner—Derris H. Banks
Assistant Examiner—Dmitry Suhol
(74) Attorney, Agent, or Firm—Robert W. J. Usher

(57) ABSTRACT

A deformable drawing tablet in which contiguous longitudinal edge portions of a stack of individual elongate strips which are confined for relative sliding movement to form a drawing surface. A user can shift individual strips longitudinally to deform the drawing surface thereby distorting an image drawn or preprinted on the drawing surface. Longitudinal end portions of the strips form a lateral edge of the tablet so that the lateral edge can be formed into profiles of different characters by shifting the strips longitudinally to different relative positions. An edge forming die includes a stencil for drawing character features. The strips are clamped in a coplanar stack by a transverse locating post, extending through slots in the strips and secured at opposite ends to a cap and a base which house an eraser and a drawing implement, respectively.

5 Claims, 4 Drawing Sheets

DEFORMABLE DRAWING TABLET

FIELD OF THE INVENTION

The invention relates to a drawing tablet having a deformable drawing surface on which a user can draw an image and subsequently progressively deform the drawing surface to progressively distort the image providing a change of expression or other amusing effect, or deform an edge portion of the drawing surface/tablet to form a profile of a selected character.

BACKGROUND OF THE INVENTION

There have been numerous puzzles of the moving block type in which images on the blocks are changed by changing the relative positions of individual blocks. However, the blocks are not intended and do not in combination provide a drawing surface, while edges of the blocks are confined in a rigid framework of constant profile. The entire underlying purpose is to make image changes difficult requiring the user and to move the blocks along a tortuous, maze-like path which is intentionally made difficult to predict. None permit the user to readily and incrementally or progressively distort an image carried by the blocks.

SUMMARY OF THE INVENTION

It is an object of the invention to provide a surface on which a user can readily draw an image and readily change or distort the image in a progressive fashion with a degree of predictability.

Another object of the invention is to provide a drawing surface having an edge portion which a user can form into a profile of a chosen character, optionally, with the aid of a die or stencil of complementary profile applied to such edge portion or by using his fingers and subsequently draw an image related to the profile.

A further object of the invention is to provide an preprinted image carrying surface which can be deformed to distort or change the preprinted image.

Accordingly the invention provides a deformable drawing tablet comprising a series of individual elongate strips; means confining the strips together for limited relative longitudinal movement over each other in parallel, coplanar relation, so that respective adjacent longitudinal edge portions of the strips are exposed and combine to form a drawing surface of the tablet and so that a user can shift individual strips longitudinally to deform the drawing tablet and thereby distort an image carried by the drawing surface.

Preferably, the strips move by sliding over each other.

It is further preferred that a lateral edge of the tablet is formed by respective longitudinal ends of the strips so that the lateral edge can be formed into profiles of different characters by shifting the strips longitudinally to different relative positions.

According to another aspect, the invention provides an amusement device comprising a series of elongate strips, means confining the strips stacked one on top of the other in parallel, coplanar relation with exposed adjacent longitudinal edge portions of the strips together forming an image carrying surface and adjacent longitudinal end portions of the strips being exposed to form a transverse side edge of the image carrying surface, individual strips being movable longitudinally over each other to one of deform an image on the image carrying surface drawing surface and form the transverse side edge into a profile of a character.

The amusement device may be incorporated into a key ring fob.

BRIEF DESCRIPTION OF THE DRAWINGS

In order that the invention may be readily understood, embodiments of a deformable drawing tablet according to the invention will now be described by way of example only with reference to the accompanying drawings in which.

DESCRIPTION OF PARTICULAR EMBODIMENT

Figure 1:
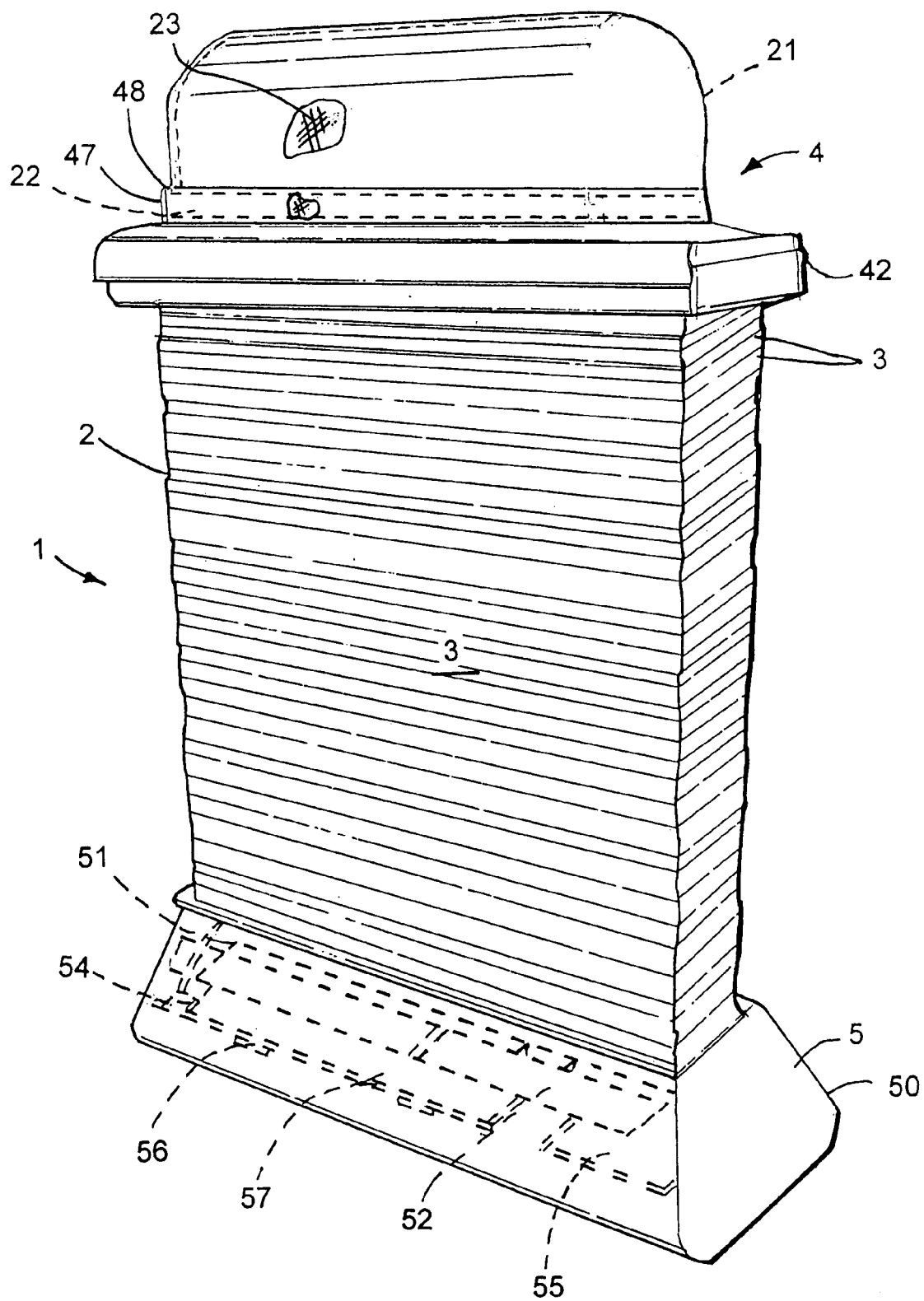
FIG. 1 is a front perspective view of a first embodiment of drawing tablet in an undeformed state.
Figure 2:
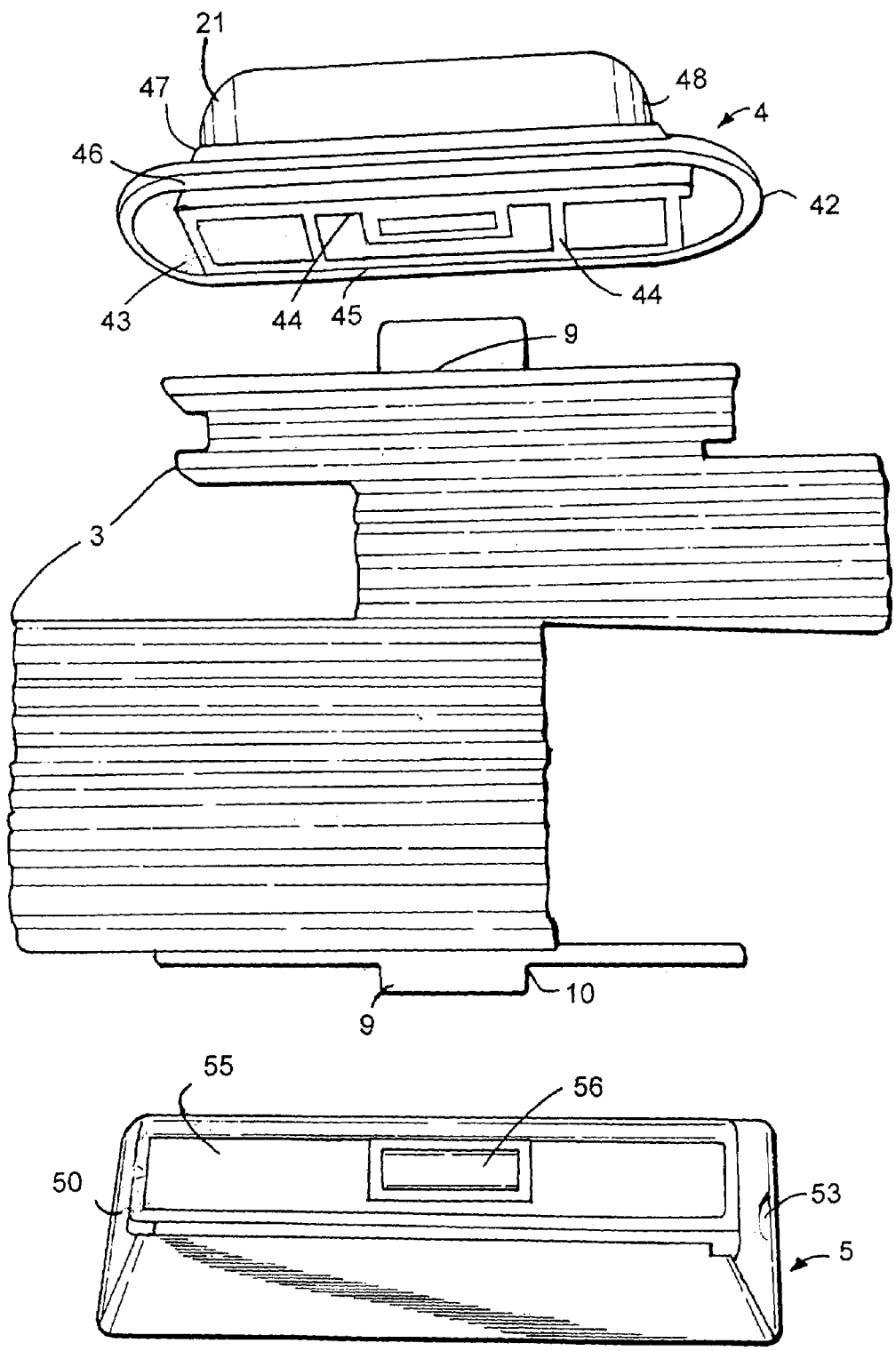
FIG. 2 is an exploded perspective view of the first embodiment with adjacent groups of slats slid to the maximum extent in opposite relative directions.
Figure 3:
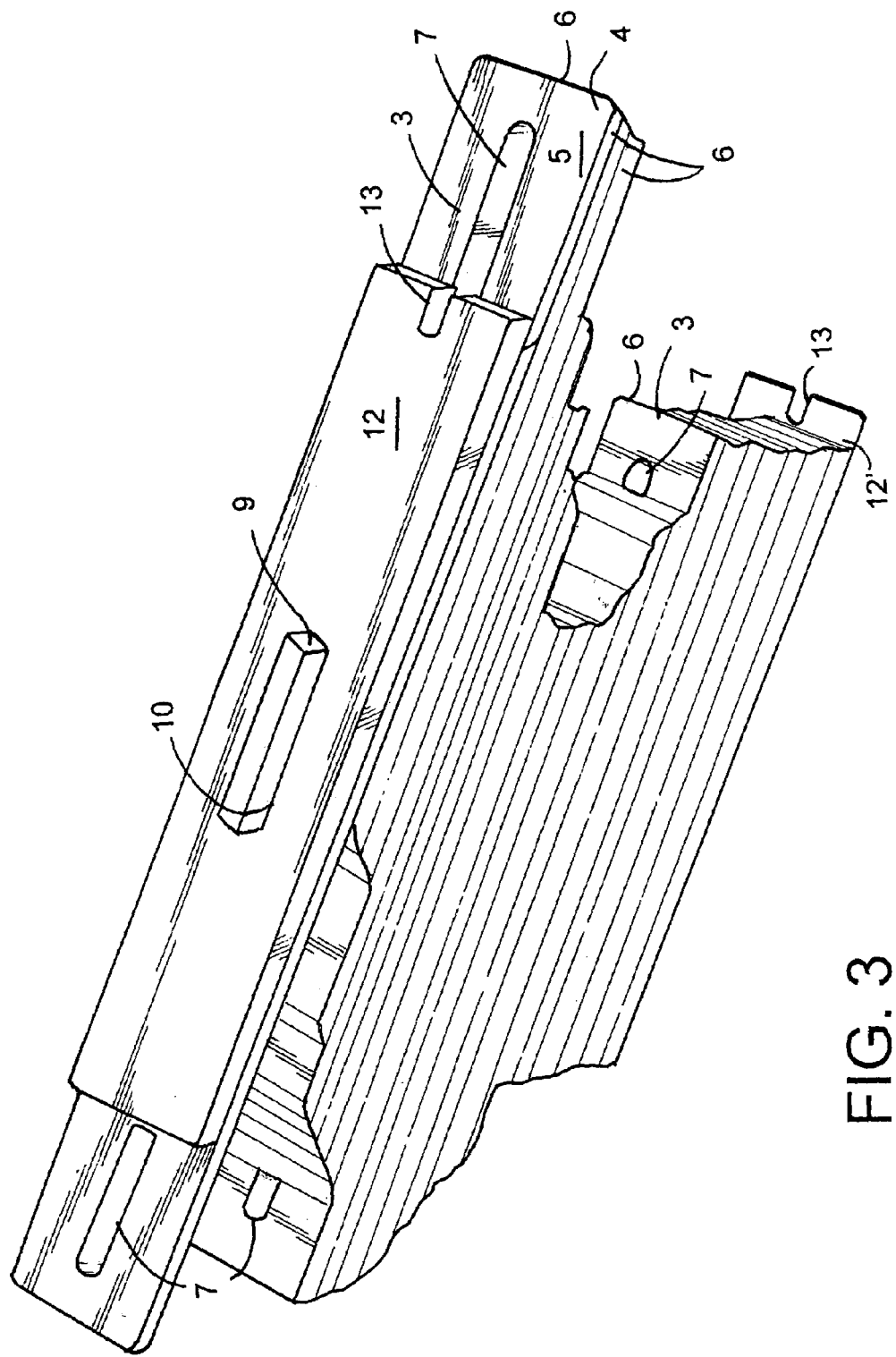
FIG. 3 is a perspective view of the top of a stack of slats held together by clamping members.

As shown in FIGS. 1–3, the deformable drawing tablet 1 comprises a stack 2 of individual strips 3 confined together in parallel relation between a cap member 4 and a base member 5, and for limited relative longitudinal sliding movement of the individual strips 3, one on top of the other, so that a face of the stack 2 forms a deformable drawing surface 3.

As shown in FIG. 3, each strip 3 comprises a slat 4 with flat, upper and lower major faces 5 joined, perpendicularly, at a front and rear by elongate, flat side edge portions 6. The slats are formed with central, longitudinally extending locating slots 7.

The slats 4 are confined together by a rectangular section post 9 which extends transversely through said slots 7 in longitudinally sliding relation therewith and has respective opposite, upper and lower ends bonded in slots 10 in respective upper and lower clamping plates 12 and 12', which clamp the slats 4 between them so that the flat side edge portions 6 are contiguous combining to form opposite, front and rear substantially flat drawing surfaces 3. The clamping plates each have a tool locating notch 13 extending inwards from a longitudinal end for locating a straight edge to aid in straightening the lateral edge of the stack.

In an alternative embodiment, the clamping plates are formed with sleeve portions around each slot for aiding retention of the post 9 therein.

In a further alternative embodiment, the clamping plates are omitted and the post is received directly as a force fit, supplemented by adhesive, in the socket in the cap member.

The cap member 4 is integrally molded with a peripheral flange 42 providing a downwardly opening recess 43 traversed by strengthening ribs 44 which define a seat for the upper clamping plate 11 and within which is a central socket 45 receiving the upwardly protruding socket 11 of the clamping plate as a press fit securing the cap member to the clamping plate. The cap member 4 has a straight, elongate apron 46 depending from a front as an aid to securement, preventing twisting of the stack relative to the cap member and to at least partly conceal the upper clamping plate from the front. The cap member 4 is further molded with an upwardly extending pocket 47 having a rim 48 on which an elongate eraser housing shell 21 is removably mounted as a press fit, storing an eraser 22 of plastic foam 23 suitable for removing penned erasable spirit ink drawings from the tablet surface. The cap member has the profile of a hat, with the flange 42 constituting a brim and the pocket 48, together with the eraser housing 21 seated thereon, constituting a crown.

The base member 5 comprises a molded pyramidal shell structure 50 providing a downwardly divergent storage compartment 51 for pen 52 having a pen admitting opening 53 at one end, closed at a bottom by a foot plate 54 adjacent the opening 53 leaving a pen access opening 55 remote from the opening 53. A slot 56 is formed below the footplate for storing a simple blade form implement 57 of the same thickness as a slat so that it can be applied, end to end of an individual slat to slide it relative to adjacent slats. The face of the implement may also be applied to the edge of the table as a straightening aid. The base member is also formed with an upwardly opening recess 55 and a central socket 56 for receiving the lower end of the post 9 as a press fit, supplemented by adhesive, mounting the stack on the base member.

The base member may be considered to have a profile of a collar which together with the hat-form cap member adds a contextural effect to an image of a face drawn on the tablet.

In one mode of operation, the user withdraws the pen from the base and sketches a simple picture of, for example, a face on the drawing surface of the tablet and then amuses himself by shifting individual slats longitudinally to incrementally and progressively distort the drawn image in a controlled manner. The user need not be an artist as even a very simple and crude line sketch, even an oval depicting an eye and a single line depicting a mouth are sufficient to afford considerable amusement to children, when distorted. The controlled and progressive incremental manner of the distortion of the drawn image may also serve as a teaching or training aid teaching the user the position of the lines to form human features and change human expression etc.

Figure 4:
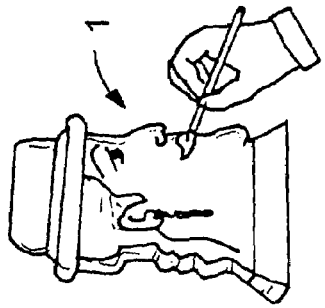
FIG. 4 is a schematic view of the drawing tablet with an edge formed into a profile of a character's face and associated facial features being drawn thereon.
Figure 5:
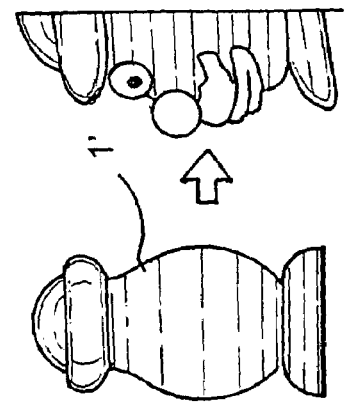
FIG. 5 is a schematic elevational view illustrating the use of a stencil to deform a drawing tablet.

As shown in FIG. 5, at least one die or stencil 61 of predetermined profile may be provided for application against the lateral edge of the tablet 1' to shift the individual slats longitudinally by predetermined different amounts to form a profile of a character, adding to the amusement effect. Alternatively, the user may simply form the profile using his fingers. The user may then draw associated facial or body features on the drawing surface to complete illustration of the character, as also shown in FIG. 4. The die or stencil may be provided with stenciling cut outs 62 in the shape of facial features such as ears, moustaches, mouths etc with the aid of which the features may be drawn directly onto the tablet.

Figure 6:
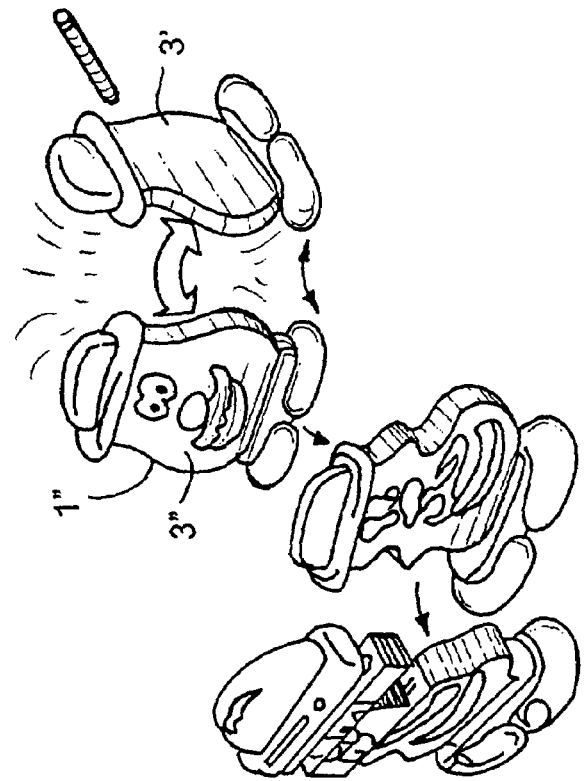
FIG. 6 is a schematic perspective view showing progressive deformation a tablet with a preprinted image thereon.

As shown in FIG. 6, one surface 3' of the drawing tablet 1" may be reserved for drawing on by the user while the opposite surface 3" may carry a preprinted image (Mr potato head) in which case the user may shift the individual slats longitudinally to distort the preprinted image or provide a profile complementary to the preprinted image. The image may be any type of indicia including, for example, color blocks, lettering etc.

Moving the slats with the fingers also provides an amusing tactile effect in combination with the amusing visual effect of progressive image distortion.

As the individual slats are retained clamped together as a stack after removal of the cap and base, the edge of the stack can be readily applied against a persons face to obtain a profile thereof.

All the components of the drawing tablet are molded from plastic material.

In one version, the slats comprise a luminescent plastic material so that the image drawn on the drawing surface by a suitable light pen provides a transient residual glow, which glow lasts only for a few minutes, thereby obviating any need for image erasure.

What is claimed is:

1. A deformable drawing tablet comprising:

a series of individual elongate strips;

means confining the strips together for limited relative longitudinal movement over each other in parallel, coplanar relation, so that respective adjacent longitudinal edge portions of the strips are exposed and combine to form a drawing surface of the tablet and so that a user can shift individual strips longitudinally to deform the drawing tablet and thereby distort an image carried by the drawing surface, the strips being formed with longitudinally extending, locating slots and the confining means comprising a post extending transversely of said strips through said slots in longitudinally sliding relation therewith transversely of the post, a cap member and a base member respectively being secured to opposite, upper and lower ends of the post, respectively, clamping the strips between them as stack, wherein the cap member provides a holder for an eraser for removing an image drawn on the drawing surface.

2. A deformable drawing tablet comprising;

a series of individual elongate strips;

means confining the strips together for limited relative longitudinal movement over each other in parallel, coplanar relation, so that respective adjacent longitudinal edge portions of the strips are exposed and combine to form a drawing surface of the tablet and so that a user can shift individual strips longitudinally to deform the drawing tablet and thereby distort an image carried by the drawing surface, the strips being formed with longitudinally extending, locating slots and the confining means comprising a post extending transversely of said strips through said slots in longitudinally sliding relation therewith transversely of the post, a cap member and a base member respectively being secured to opposite, upper and lower ends of the post, respectively, clamping the strips between them as stack, wherein the base member provides a holder for an implement for drawing an image on the drawing surface.

3. A deformable drawing tablet comprising:

a series of individual elongate strips;

means confining the strips together for limited relative longitudinal movement over each other in parallel, coplanar relation, so that respective adjacent longitudinal edge portions of the strips are exposed and combine to form a drawing surface of the tablet and so that a user can shift individual strips longitudinally to deform the drawing tablet and thereby distort an image carried by the drawing surface, wherein a lateral edge of the tablet is formed by respective longitudinal ends of the strips so that the lateral edge can be formed into profiles of different characters by shifting the strips longitudinally to different relative positions, in combination with a die for application along the lateral edge of the tablet to shift individual strips into predetermined different positions to form one of said profiles.

4. A deformable drawing tablet according to claim 3 wherein the die is provided with at least one cut-out by which an image can be stenciled onto the drawing surface.

5. A deformable drawing tablet comprising a series of elongate strips, means confining the strips stacked one on top of the other in parallel, coplanar relation with exposed adjacent longitudinal edge portions of the strips together forming a drawing surface and adjacent longitudinal end portions of the strips being exposed to form a transverse side edge of the drawing surface, individual strips being movable longitudinally over each other by a user to form the transverse side edge into a profile of a character so that an associated image can then be drawn on the drawing surface by the user to illustrate the profile, creating an image of the character wherein the drawing surface comprises a luminescent plastic material on which an image can be drawn with a light pen so that the image provides a transient residual glow.

\* \* \* \* \*